Patented May 19, 1953

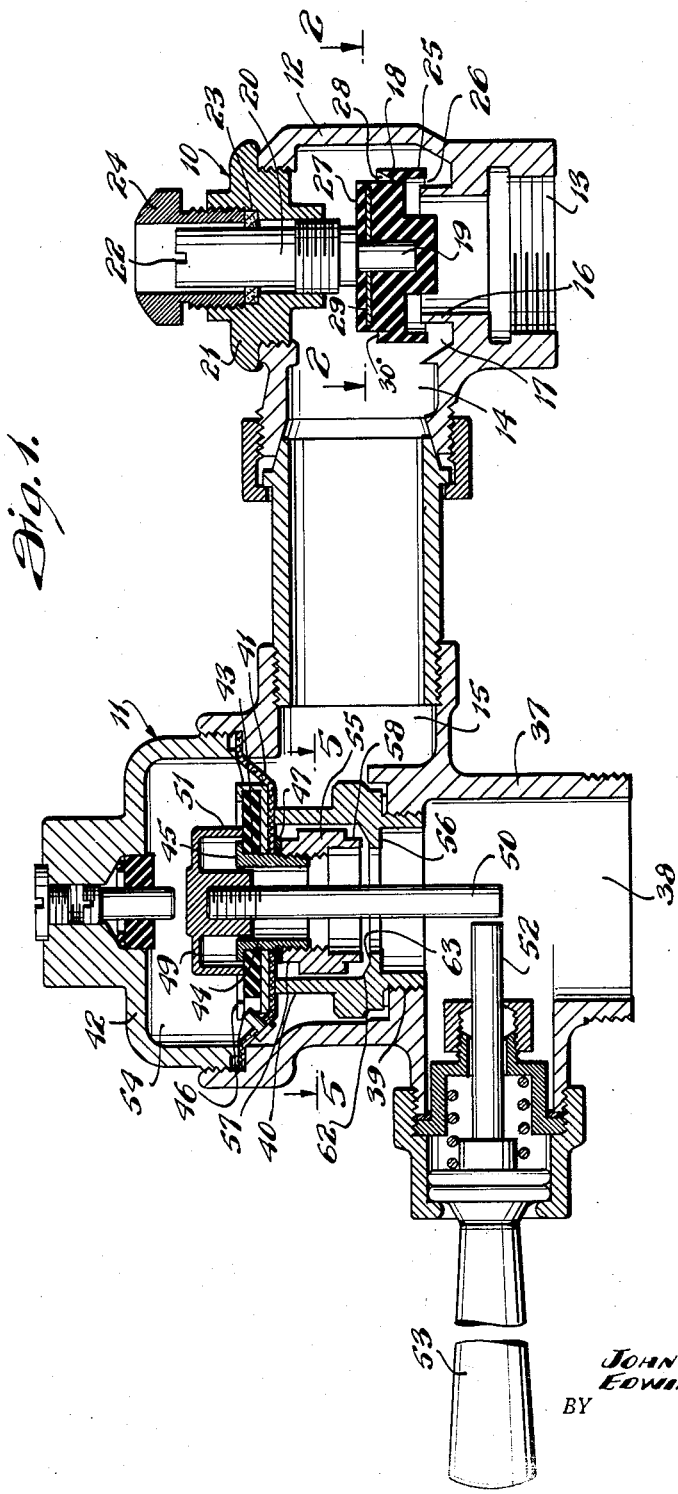

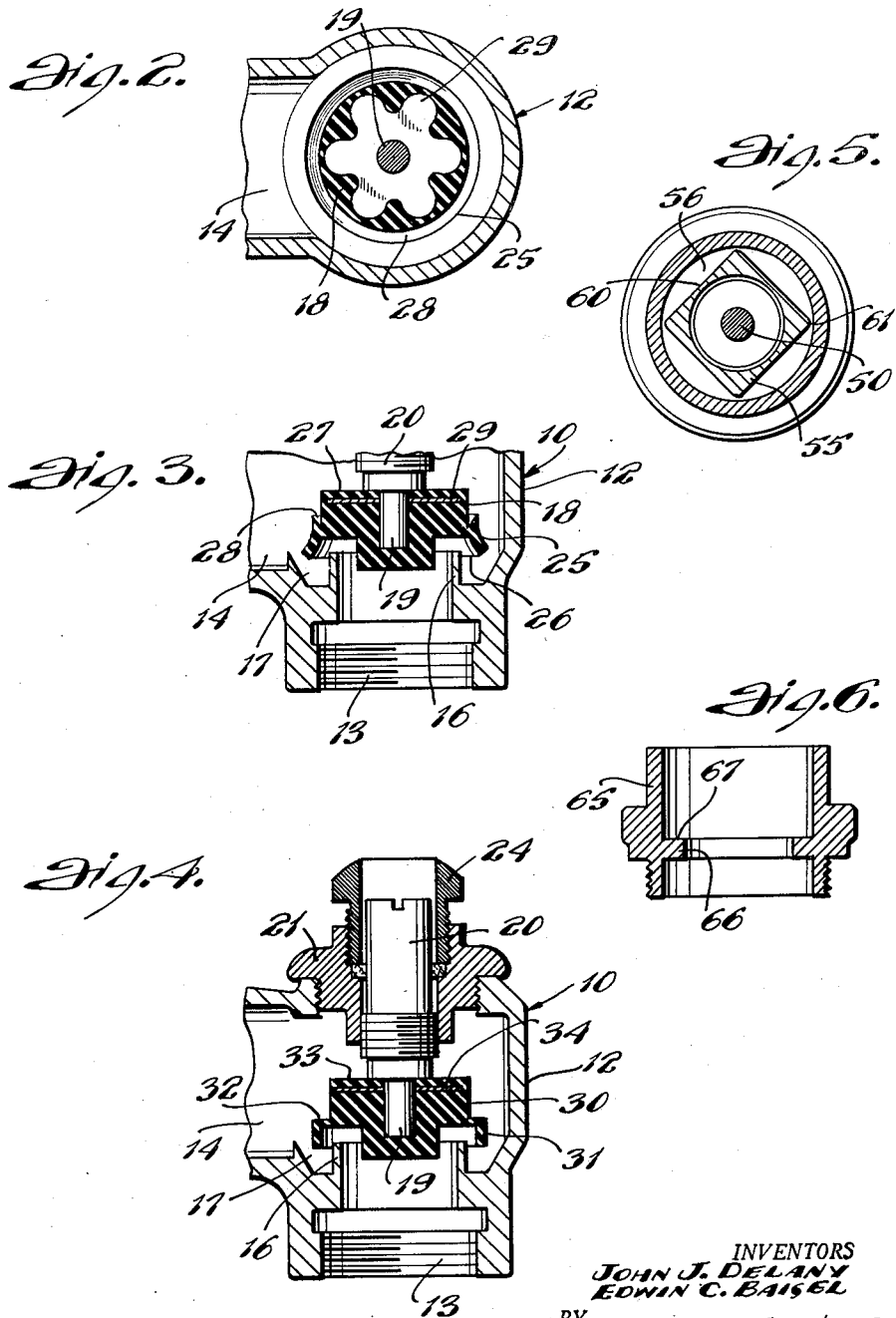

2,638,929

UNITED STATES PATENT OFFICE 2,638,929

SELF-THROTTLING VALVE

John J. Delany and Edwin C. Baisel, New York, N. Y., assignors to Delany Realty Corporation, New York, N. Y., a corporation of New York Application June 4, 1949, Serial No. 97,256

2 Claims. (Cl. 137—712)

This invention relates to a valve which is constructed and arranged for effectively silencing the flow of liquid therethrough.

The invention comprehends a valve which is adapted to be set at an optimum position for any normal range of pressure and volume and which is self-throttling to provide a passageway varying in relation to the pressure of the liquid.

Another object of the invention is to provide a valve having a resilient valve element which is adapted to flex with the pressure of the liquid to progressively enlarge the passageway to thereby reduce the velocity of the liquid and which valve element returns to normal position when the pressure within the valve builds up to the line pressure so as to automatically reduce the circumferential area at the throat and thereby provide for the silent flow of the liquid and silent shut off of the valve.

Another object of the invention is to provide a valve having a resilient valve element which flexes so as to reverse the direction of flow of the liquid through the throat between the valve seat and the body of the valve.

Still another object of the invention is to provide a valve having a valve element formed with a resilient skirt disposed in spaced surrounding relation with the peripheral wall defining the opening through the valve seat and which skirt flexes with the pressure to vary the area of flow of the liquid adjacent the valve seat.

Another object of the invention is to provide a throttling valve for throttling the supply of water leading to a flush valve which latter valve is constructed and arranged for producing a back pressure below the diaphragm during closing movement thereof to provide a silent closing valve.

With the foregoing and other objects in view, reference is now made to the following specification and accompanying drawings in which the preferred embodiment of the invention is illustrated.

In the drawings:

Fig. 1 is a vertical sectional view of a throttling valve constructed in accordance with the invention and illustrating the same in association with a flush valve.

Fig. 2 is a fragmentary horizontal sectional view taken approximately on line 2—2 of Fig. 1.

Fig. 3 is a fragmentary vertical sectional view of the throttling valve showing the skirt of the valve element outwardly flexed to enlarge the passageway or throat.

Fig. 4 is a fragmentary vertical sectional view of the throttling valve illustrating a modified form of valve element.

Fig. 5 is a fragmentary horizontal sectional view taken approximately on line 5—5 of Fig. 1.

Fig. 6 is a vertical sectional view illustrating a modified form of sleeve.

Referring to the drawings by characters of reference, the invention is illustrated in its application to a throttling valve 10 connected with a flush valve 11 for regulating the flow of flushing water within normal range of pressure and volume and for producing a silent flow of the water and a silent shutting off of the flow. This throttling action is effected by a varying passageway which automatically enlarges as the pressure increases and which gradually returns to normal as the pressure within the valve approaches a static condition.

The valve 10 consists of a casing 12 having an inlet 13 and a lateral outlet 14 connected with the inlet 15 of the flush valve 11. The inlet 13 is adapted to be connected with a water supply line for supplying water to the flush valve. The casing 12 is formed with a peripheral wall 16 formed integrally therewith and projecting inwardly in axial alignment with the inlet 13 and with an annular recess 17 surrounding said peripheral wall and disposed between said wall and the casing.

The peripheral wall 16 forms a passageway for the water and a valve seat for a valve element 18 arranged in axial alignment therewith and disposed on the reduced lower end 19 of a valve stem 20 threadedly engaged in a head 21 removably secured in the casing. The valve stem 20 protrudes through the head 21 and is formed with a kerf 22 in the outer end thereof adapted for receiving a tool for adjusting the valve element 18 toward and away from the peripheral wall 16. The head is formed with an enlarged recess in which a packing ring 23 is arranged in surrounding relation with the valve stem and secured in position therein by a nut 24 threadedly engaged in said recess.

In order to automatically vary the passageway between the peripheral wall 16 and the valve element 18 in relation to the pressure, the valve element 18 is fashioned of flexible resilient material and is formed with a depending skirt 25 which is of larger internal diameter or size than the external diameter or size of the peripheral wall 16. The skirt 25 is concentric with the peripheral wall 16 and is disposed in surrounding spaced relation therewith so as to provide an annular passageway or throat 26 therebetween for reversing the direction of flow of the water, which after passing upwardly through the passageway in the peripheral wall 16 and upon striking the under side of the valve element 18 and the depending skirt 25 is deflected downwardly and through said annular passageway or throat 26 and thence outwardly and upwardly between the valve element 18 and the wall of the casing.

The skirt 25 is adapted to flex outwardly as shown in Fig. 3 of the drawings so as to enlarge the annular passageway or throat 26 when the flush valve 11 is opened to permit of the flow of the water therethrough. The outward flexing of the skirt is in relation to the pressure at the inlet 13 which is in excess of the pressure in the outlet 14 to thereby increase the cross-sectional area of the passageway or throat 26 and decrease the velocity of the water whereby the noise incident to high velocity and pressure is minimized.

As the flush valve 11 closes, the pressure in the outlet 14 of the throttling valve 10 gradually increases and with the increase of pressure therein, the skirt 25 gradually returns from the flexed position shown in Fig. 3 toward the normal position shown in Fig. 1 and when the flush valve 11 is closed, the pressure in the outlet 14 of the throttling valve 10 will equal the pressure in the inlet 13 thereof whereby the skirt 25 will return to the normal position shown in Fig. 1. This results in a gradual decrease of the cross-sectional area of the passageway or throat 26 so as to produce silent flow of the water during closing of the flush valve 11 and silent shut off of the water when the flush valve 11 closes.

In order to provide for the required flexing of the skirt 25, the upper portion 27 of the valve element 18 is reduced in cross-sectional diameter or size and an annular top wall 28 is provided above the skirt 25 which extends outwardly at the base of said reduced portion at an angle of approximately 30 degrees therewith, as illustrated in Fig. 1 of the drawings. The reduced upper portion 27 of the valve element 18 is provided with a thin apertured metallic plate 29 embedded therein with the aperture disposed in surrounding fitted engagement with the reduced end 19 of the valve stem 20. This reinforces the upper reduced portion of the valve element so as to hold the valve element in position thereon and prevents distortion of the body of the valve element while permitting of the flexing of the skirt 25 with the pressure.

Instead of the angulated top wall 28 between the reduced upper portion 27 and the outer face of the skirt 25 of said valve element, the same may be formed as illustrated in Fig. 4 of the drawings in which a valve element 30 is provided with a depending skirt 31 narrowly connected therewith by a thin horizontally extending annular wall 32. In this form also the reduced upper portion 33 of the valve element 30 is provided with an apertured metallic plate 34 embedded therein in surrounding relation with the reduced end 19 of the valve stem 20. The valve element 30 is also formed of flexible resilient material and constructed in this manner the skirt 31 flexes with the pressure similar to the valve element 18 in the previously described form.

The flush valve 11 includes a valve body 37 having the inlet opening 15 and an outlet opening 38 which is threaded for receiving a pipe for connecting the water discharged through the flush valve to the flush bowl. Intermediate the inlet and outlet openings the casing is formed with a threaded opening 39 in which a tubular sleeve 40 is removably secured and extends upwardly therefrom with the rim thereof defining a valve seat.

A flexible diaphragm 41 is mounted within the casing above the tubular sleeve 40 and has its marginal edge secured between the body of the casing and a removable cap 42. The diaphragm 41 is formed with a central opening 43 in which an outlet tube or bushing 44 is fitted and extends upwardly therefrom with the flanged upper end 45 projecting into overlying relation with a head 46 affixed to the upper face of the diaphragm 41 and to the bushing 44 by a retaining nut 47 threadedly engaged on the lower end of the bushing 44 and tightened against the under side of the diaphragm 41. A rockable valve element 49 having a depending actuator stem 50 protruding through the bushing 44 and the tubular sleeve 40 is provided with a depending annular rim 51 adapted to engage the upper face of the head 46 to close the passageway through the bushing 44 and tubular sleeve 40. In this type of flush valve the actuator stem 50 is disposed adjacent the inner end of an actuator rod 52 mounted in the casing for rocking movement and having a handle 53 for manipulating the same to tilt or rock the valve element 49 to thereby permit of the discharge of water from the chamber 54 above the diaphragm 41 whereby the diaphragm will be moved upwardly from its seat by the pressure of the water in the inlet 15 so that the water will flow from the inlet through the tubular sleeve 40 and through the outlet 38.

In order to reduce the velocity and pressure of the water flowing through the flush valve particularly during the closing movement of the diaphragm 41 to seated engagement on the tubular sleeve 40, a tubular guide 55 having an interiorly threaded upper end is secured to the depending lower end of the outlet tube or bushing 44 with the lower end of the guide located in spaced relation with the upper annular face of an internal flange 56 when the diaphragm 41 is in seated engagement on the rim of the tubular sleeve 40. The internal flange 56 is formed integrally with and extends inwardly from the inner periphery of the tubular sleeve 40. The guide 55 is formed with annular upper and lower end portions 57 and 58 and intermediate said end portions the guide is of square formation in cross-sectional configuration as indicated at 60 in Fig. 5 of the drawings and with beveled edges 61 between the side faces thereof which loosely fit the inner periphery of the tubular sleeve 40. The internal flange 56 is formed with a beveled annular upper face portion 62 extending downwardly from the inner peripheral wall of the tubular sleeve 40 and with an annular horizontal face portion 63 extending from the inner periphery of the said flange to the said beveled face 62. The annular lower end portion 58 of the guide 55 is disposed above and in axial alignment with the horizontal face portion 63 of said flange 56.

Instead of the tubular sleeve 40, a tubular sleeve 65 may be employed which is adapted to be threadedly secured in the opening 39 in the valve body and which is provided with an internal flange 66 extending inwardly from the inner periphery of said tubular sleeve. The internal flange 66 is formed with an annular horizontal upper face 67 which is disposed in axial alignment with the lower annular end portion 58 of the guide 55. The upper annular portion 57 of the guide 55 and the inner periphery of the tubular sleeve 40 adjacent the seat thereof forms an annular passageway for the water which is relatively larger than the passageway between the inner periphery of said tubular sleeve and the intermediate portion 60 of square formation in cross-sectional configuration of said guide. The lower annular end portion 58 of said guide and the inner periphery of the tubular sleeve 40 also forms a passageway which is relatively larger than the passageway between the inner periphery of the tubular sleeve 40 and the intermediate portion 60 of square formation in cross-sectional configuration of said guide.

When the handle 53 is manipulated to tilt the valve element 49 to thereby permit of the discharge of water from the chamber 54, the diaphragm is raised by the pressure of the water in the inlet 15 and the flow thereof through the flush valve is controlled by the differential of area of the passageway surrounding the upper annular end portion 57 and the passageway surrounding the intermediate portion 60 thereof. As the diaphragm approaches its seat on the upper end of the tubular sleeve 40 the lower annular end portion 58 of the guide approaches the internal flange 56 to thereby reduce the passageway therebetween so as to build up a back pressure retarding the flow of water in the chamber at the upper end of the guide. This back pressure and the reduction in the velocity of the water at the upper end of the guide eliminates the squealing noise usually caused by the diaphragm as it approaches its seat. The horizontal formation of the upper surface of the internal flange 56 directs the water radially inward causing turbulence which reduces the velocity thereof so as to eliminate any close off noise in the flush valve.

The throttling valve 10 and flush valve 11 provide a combination which is automatic in operation to decrease the velocity of the water and thus reduce the noise of flow which is incident to high velocity. The throttling valve 10 functions to gradually reduce the size of the passageway or throat as the pressure in the inlet and outlet sides thereof approaches a static condition during close off movement of the flush valve 11 to thereby eliminate noise in the flow of water through the throttling valve, while the formation of the tubular sleeve and the guide 55 in the flush valve functions to eliminate the squealing noise in the water during closing movement of the diaphragm.

It is to be understood that the passageway within the peripheral wall 16 is relatively larger in cross-sectional area than the passageway surrounding the guide 55 and that the latter passageway is relatively larger in cross-sectional area than the passageway within the internal flange 56. This progressive reduction in cross-sectional area provides a sustained back pressure in the throttling and flush valves which is required in order that the skirt 25 in the throttling valve 10 and the combination of the tubular sleeve 40 and tubular guide 55 operate as hereinbefore set forth to eliminate the noise of the water flowing therethrough and during the closing movement of the diaphragm of the flush valve.

What is claimed is:

1. An automatic throttling valve including a casing having a chamber therein and inlet and outlet openings and a peripheral wall surrounding the inlet opening and extending into and terminating in said chamber, a valve element carried by said casing and having an inner end adapted to be disposed in narrowly spaced relation to the inner end of said peripheral wall to provide a narrow passageway therebetween, said valve element having a flexible resilient skirt extending from said inner end into surrounding spaced relation to the end of said peripheral wall, and said peripheral skirt flexing outwardly by the pressure of the flow of the liquid thereagainst and gradually returning to unflexed surrounding relation with said peripheral wall with the reduction of flow of the liquid through the valve to thereby minimize noise with the reduction of flow.

2. An automatic throttling valve including a casing having a chamber therein and inlet and outlet openings and a peripheral wall surrounding the inlet opening and extending into and terminating in said chamber, a valve element carried by said casing and having an inner end adapted to be disposed in narrowly spaced relation to the inner end of said peripheral wall to provide a narrow passageway therebetween, said valve element having a flexible resilient skirt narrowly connected with the inner end of said valve element continuously about the periphery thereof and extending from said inner end into surrounding spaced relation to the end of said peripheral wall, and said peripheral skirt flexing outwardly by the pressure of the flow of the liquid thereagainst and gradually returning to unflexed surrounding relation with said peripheral wall with the reduction of flow of the liquid through the valve to thereby minimize noise with the reduction of flow.

JOHN J. DELANY.
EDWIN C. BAISEL.

References Cited in the file of this patent

UNITED STATES PATENTS

| Number | Name | Date |
| --- | --- | --- |
| 1,839,962 | Groeniger | Jan. 5, 1932 |
| 1,858,420 | Sloan | May 17, 1932 |
| 2,026,506 | Binnall | Dec. 31, 1935 |
| 2,181,900 | Langdon | Dec. 5, 1939 |
| 2,205,533 | Langdon | June 25, 1940 |
| 2,460,647 | Miller | Feb. 1, 1949 |
| 2,489,932 | Rosenblum | Nov. 29, 1949 |
| 2,523,864 | Delany | Sept. 26, 1950 |
| 2,534,874 | Mettler | Dec. 19, 1950 |